Patented May 13, 1924.

1,493,554

UNITED STATES PATENT OFFICE.

GEORGE W. LOEBER, OF WAUKEGAN, ILLINOIS.

CARBON AND SOOT REMOVING COMPOSITION.

No Drawing. Application filed October 13, 1922. Serial No. 594,402.

*To all whom it may concern:*

Be it known that I, GEORGE W. LOEBER, a citizen of the United States, residing in Waukegan, in the county of Lake and State of Illinois, have invented certain new and useful Improvements in Carbon and Soot Removing Compositions, of which the following is a specification.

The present invention relates to a composition of matter having the properties of acting upon and effecting the removal, eradication or elimination of soot, carbon and the like from the walls, surfaces and the like of devices used for heating and like purposes, and in which the combustion of carbonaceous materials takes place.

Among the objects of this invention is to produce a composition of matter capable, in the presence of heat, to remove, eradicate, eliminate or otherwise destroy deposits of carbon, soot, and the like, in the combustion chambers, passages, flues, stovepipes, stacks and the like of heating devices and similar apparatus, such as stoves, furnaces, fire-places, grates, heaters, steam, gas, vapor or hot water boilers, and the like; to produce a mixture of materials which, in the presence of heat and the materials in a combustion chamber or the like, will undergo partial combustion and generate fumes, gases and the like which will combine with, take up and remove the carbon and soot lodged upon the surfaces and in the places above mentioned; to provide a mixture of mineral compounds or ores which, in the presence of materials undergoing combustion, and the heat arising therefrom, will react with the carbon, soot and the like deposit to effect the result above indicated; to mix ores, such as sphalerites or blende being mainly chemically a sulphide of zinc and marcasite or iron pyrites being mainly chemically a sulphide of iron, which, when mixed together will have the properties and qualities above mentioned; to apply such mixture, in the proportions later mentioned, to the fire bed or in the combustion chamber above the fire bed of the heating device; and to provide such a composition having such other objects, capabilities and advantages as will later appear and are inherently possessed by the composition.

In preparing the composition I prefer to use the ingredients in about the following proportions, namely, ninety-eight parts by weight of zinc concentrate, and two parts by weight of marcasite or iron pyrites. As above indicated, the zinc concentrate is preferably sphalerite or blende. I have found that good results may be obtained, also, if the proportions be varied, as for example the ingredients may be combined in the proportions from forty-five to ninety-eight parts by weight of zinc ore concentrates, and from fifty-five to two parts by weight of marcasite or iron pyrites.

In use the mixture or composition is preferably mixed in sufficient quantity to be placed upon a hot fire, as upon a hot fire bed within a fire chamber. After closing the doors, the heat will cause a reaction in the mixture so as to give off fumes, vapors and the like which will come into contact with the coated surfaces and walls of the heating device and the passages connected to it. After a short period of time, such as from twenty to thirty minutes, all of the carbon and soot accumulations within the heating apparatus and the connecting passages are removed by such fumes and vapors. The carbon and soot pass upwardly in the form of a fume, dust or the like into the atmosphere. The action of the composition is not limited to the passages through which the flow of the hot gases ordinarily take, but will also act into connecting passages, from other heating apparatus. It is a very active agent, and far reaching in its action.

While I have herein described some specific ingredients and proportions of the composition or mixture, it is to be understood that the invention is not limited to the particular ingredients or proportions named, but other equivalent ingredients and other proportions are comprehended by the invention without departing from the spirit thereof.

Having now described my invention, I claim:—

1. A composition for removing carbon and soot from the interior of heating apparatus and connecting passages comprising a zinc ore concentrate and marcasite or iron pyrites.

2. A composition for removing carbon and soot from the interior of heating apparatus and connecting passages comprising forty-five to ninety-eight parts by weight of zinc ore concentrates and fifty-five to two parts of marcasite or iron pyrites.

3. A composition for removing carbon and soot from the interior of heating apparatus and connecting passages, comprising ninety-eight parts by weight of zinc ore concentrates and two parts by weight of marcasite or iron pyrites.

In witness whereof, I hereunto subscribe my name to this specification.

GEORGE W. LOEBER.